United States Patent
May et al.

(10) Patent No.: US 7,237,092 B2
(45) Date of Patent: Jun. 26, 2007

(54) MICROPROCESSOR CIRCUIT FOR PORTABLE DATA CARRIERS AND METHOD FOR OPERATING THE CIRCUIT

(75) Inventors: Christian May, München (DE); Holger Sedlak, Egmating (DE)

(73) Assignee: Infineon Technologies AG, Munich (DE)

( * ) Notice: Subject to any disclaimer, the term of this patent is extended or adjusted under 35 U.S.C. 154(b) by 354 days.

(21) Appl. No.: 10/622,981

(22) Filed: Jul. 18, 2003

(65) Prior Publication Data

US 2004/0059895 A1 Mar. 25, 2004

Related U.S. Application Data

(63) Continuation of application No. PCT/DE02/00093, filed on Jan. 15, 2002.

(30) Foreign Application Priority Data

Jan. 18, 2001 (DE) ................................ 101 02 202

(51) Int. Cl.
*G06F 15/00* (2006.01)
*G06F 15/76* (2006.01)
(52) U.S. Cl. .......................... 712/36; 712/38
(58) Field of Classification Search ................ 712/36, 712/38
See application file for complete search history.

(56) References Cited

U.S. PATENT DOCUMENTS 4,224,666 A * 9/1980 Giraud ......................... 235/380
4,558,176 A * 12/1985 Arnold et al. ............... 713/190
4,757,440 A * 7/1988 Scheuneman ................. 714/53
4,802,218 A * 1/1989 Wright et al. ................. 705/60
4,945,510 A    7/1990 Maeda et al.
5,056,060 A * 10/1991 Fitch et al. ..................... 710/3
5,293,424 A * 3/1994 Holtey et al. ................ 713/193
5,802,339 A    9/1998 Sowadsky et al.
5,881,265 A    3/1999 McFarland et al.
5,944,810 A    8/1999 Cherabuddi
6,047,365 A * 4/2000 Chambers et al. .......... 711/220
6,085,275 A    7/2000 Gallup et al.
6,094,724 A * 7/2000 Benhammou et al. ........ 726/20
6,199,156 B1   3/2001 Yoder et al.

FOREIGN PATENT DOCUMENTS

| EP | 0 955 583 A2 | 11/1999 |
| JP | 63 156 236 A | 6/1988 |
| JP | 01 142 943 A | 6/1989 |
| JP | 10 283 188 A | 10/1998 |

* cited by examiner

Primary Examiner—Daniel H. Pan
(74) Attorney, Agent, or Firm—Laurence A. Greenberg; Werner H. Stemer; Ralph E. Locher

(57) ABSTRACT

A microprocessor circuit includes a control unit, a memory for free programming with at least one program having functions, a stack for buffer-storing data, a register bank having at least one register, and an auxiliary register that stores a number of bits, each of the bits being assigned to one of the registers of the register bank and indicating whether or not a respective register of the register bank contains information items.

19 Claims, 4 Drawing Sheets

MICROPROCESSOR CIRCUIT FOR PORTABLE DATA CARRIERS AND METHOD FOR OPERATING THE CIRCUIT

CROSS-REFERENCE TO RELATED APPLICATION

This is a continuation of copending International application PCT/DE02/00093, filed Jan. 15, 2002, which designated the United States, and which was not filed in English.

BACKGROUND OF THE INVENTION

Field of the invention

The invention relates to a microprocessor circuit for portable data carriers having at least one control unit, at least one memory for free programming with at least one program having functions, a stack for buffer-storing data, and a register bank having at least one register.

Microprocessor circuits of the afore-mentioned type are, preferably, used in so-called smart cards, i.e., identity cards, credit cards, charge cards, and the like, which are equipped with an integrated circuit. However, the microprocessor circuits can also be used in so-called payment transaction modules that communicate with the above-mentioned cards through corresponding interfaces.

One of the important advantages of such a card lies in the diverse uses that are possible for the cardholder. The microprocessor contained in the integrated circuit and the associated storage allow extensive data processing in the card itself, whereas cards provided with a magnetic strip, for example, make it necessary for all the data processing operations to be carried out externally.

The card manufacturer can equip the microprocessor with a resident operating system that performs basic functions, for example, procedures for comparing a code input externally with a stored code and the like. The memories associated with the microprocessor serve not only for storing the operating system but also for storing particular applications, which may include a plurality of functions, and parameters that are necessary, e.g., for security checking, and must at all events be kept secret.

Diverse application of the cards is achieved when an operating system with associated programs forms a starting point, certain interfaces are defined and a memory or memory area is reserved for an external program. The card manufacturer, then, provides for the user, i.e., for the organization that issues cards, a memory or memory area for programming in its external program. In this external program, the organization can, then, define specific operations that are independent of the operating system and relate only to the specific organization.

The microprocessor circuits of the afore-mentioned type are provided with at least one register bank that is available to the function currently being executed, the so-called context. In the event of a function call of a second function from a first function, the registers occupied by data of the first function must be stored on a buffer store, a stack. In the second function, these registers are, then, available to the second function for writing. Upon the return from the second function to the first function, the data buffer-stored on the stack must be written to the register again.

Storing the registers on the stack or reading the registers from the stack by corresponding write/read operations for the individual registers requires a comparatively large number of instructions, which leads to a significant enlargement of the program code. Furthermore, there is the problem that, in the event of a function change or function call, the data associated with the first function in the register can still be read by the second function. This can constitute a security problem, for example, in the case of credit cards. This is because the second function could read, if appropriate, still secret data in the registers that should, intrinsically, be known only to the first function.

From the prior art, an instruction is known with which individual registers of a register bank can be selected, which are, then to be stored on the stack. The instruction "ST REGMASK (bit mask) (SP)" is able to use the bit mask to select only the registers of a register bank that have a content and to store them on the stack. Furthermore, this instruction includes a "stack pointer SP", which points to the next free address of the stack. The information as to which registers are occupied by a datum is defined by the compiler, i.e., by the CPU. The bit mask is created from these information items. When the data are read back from the stack into the resisters, the compiler is able to ascertain which registers were originally occupied. The data are written back to the correct registers in accordance with this information of the bit mask.

A single instruction can be used to store the written-to registers in the stack. Upon the call of the instruction ST REGMASK (bit mask) (SP), the registers are written directly to the stack. However, a plurality of clock cycles are required for the execution of the entire instruction. Only afterwards can a second function be called, to which the registers on the register bank are, then, available. It is disadvantageous, moreover, that the stack constitutes a subarea of the memory that is accessible to the programmer and, thus, also to all the other programs or functions. It is, therefore, possible to covertly discover these data.

The use of so-called "register windows", a register window being available to a function, is also known. If a second function is called, then a further register window is selected by way of the change in a "register pointer". The further register window is, then, available to the second function for writing. The register bank can have a plurality of register windows. As soon as the last unwritten register window is called by a function and written to, the registers of one or more register windows can be buffer-stored simultaneously on a stack. It is, thus, possible to simultaneously write to a register for the current function at that time and also to store the register contents of a previously active function. A particularly time-saving variant is, thus, involved. What is disadvantageous, however, is that all the registers of a register window are written to the stack regardless of whether or not the registers have a datum.

SUMMARY OF THE INVENTION

It is accordingly an object of the invention to provide a microprocessor circuit for portable data carriers and method for operating the circuit that overcome the hereinaforementioned disadvantages of the heretofore-known devices and methods of this general type and that ensure, using simple measures, that the register contents of one function are not accessible to another function.

With the foregoing and other objects in view, there is provided, in accordance with the invention, a microprocessor circuit, including at least one control unit, at least one memory for free programming with at least one program having function, the memory connected to the control unit, a stack for buffer-spring data, the stack connected to the control unit, a register bank having registers, the register bank connected to the control unit, and an auxiliary register storing a number of bits, each of the bits being associated with one of the registers of the register bank and indicating whether or not a respective one of the registers contains a value different from a logical "0", the auxiliary register connected to at least one of the control unit, the register bank, and stack.

According to the invention, the microprocessor circuit has an auxiliary register that stores a number of bits, each of the bits being assigned to one of the registers of the register bank and indicating whether or not a respective registers of the register bank contains information items.

The assignment of a respective bit to a register of the register bank makes it possible, in a simple manner, to distinguish between written-to and non-written-to registers. Consequently, when storing the register contents of a stack, it is possible to store only those registers that actually have a datum.

By virtue of the fact that the registers having a datum do not have to be determined by a compiler, the registers can be stored quickly, in an energy-efficient manner and with little program code, namely, a single instruction.

In a first embodiment, the auxiliary register has a number of further registers corresponding to the number of registers of the register bank, each of these further registers being provided for the storage of a single bit. The auxiliary register, thus, likewise represents a register bank.

In accordance with a second embodiment, the auxiliary register has exactly one further register, the further register being provided for the storage of a bit sequence that corresponds to the number of registers of the register bank. The auxiliary register is, preferably, a register of the register bank. Consequently, in this second embodiment, it is not necessary to modify a microprocessor circuit known per se because the auxiliary register is stored in a register of the register bank. The bottom-most or top-most register is, preferably, used for this.

In accordance with another feature of the invention, in a preferred refinement of the microprocessor circuit, a further stack that cannot be managed by the programmer is provided for the storage of the data contained in the register bank. This further stack is referred to as a so-called "context safe area". The latter is a hardware-internal stack that may be part of the memory. Data that are stored in this further stack cannot be interrogated or written by a software stored, in the memory. The management of the further stack is subject solely to the operating system. Therefore, manipulation of these data is not possible.

In accordance with a further feature of the invention, the register bank, preferably, has a first and a second area with first and second registers, at least the first registers being assigned a bit in the auxiliary register. The division of a register bank into a first area (upper context) and a second area (lower context) results from the fact that, in the event is of a function call, parameters of a first function are often transferred to the second function. These parameters are stored in the registers of the second area (lower context). From this second area, the second called function, then, fetches the parameters for further processing. By contrast, the first area of the register bank (upper context) is used and written to only by the second called function. Should a third function be called by the second function, then it suffices merely to store the registers of the first area of the register bank on the stack. By contrast, the transfer parameters in the registers of the second area can be overwritten or, if appropriate, even be read out by the third function.

It is also conceivable, of course, for the registers of the second area also to be assigned to the auxiliary register so that, in the event of a function call and function change, all the registers of the register bank, i.e., those of the first and second areas, would be stored on the stack.

In accordance with an additional feature of the invention, the first area of the register bank can be divided into a plurality of sub-areas that are, respectively, available to one of the functions. This division into a plurality of sub-areas corresponds to the register windows mentioned in the introduction. Provided that the first area of the register bank has a sufficiently high number of registers, this variant opens up an extremely energy-efficient, fast procedure, which is a major advantage, particularly, in the case of microprocessor circuits in portable data carriers.

With the objects of the invention in view, there is also provided a method for operating a microprocessor circuit, including the steps of providing a circuit with at least one control unit, at least one memory for free programming with at least one program having functions, a stack for buffer-storing data, a register bank having registers, and an auxiliary register, setting all of the bits of the auxiliary register to a logical "0" when the circuit is initialized, storing bits in the auxiliary register, each of the bits being associated with one of the registers and indicating whether or not a respective one of the registers contains a value different from a logical "0", and setting a bit of the auxiliary register associated with a respective one of the registers to a value different from the logical "0" when a datum is written to the associated register of the register bank.

In the case of the method according to the invention for operating the microprocessor circuit described above, when the microprocessor circuit is initialized, all the bits of the auxiliary register are set to a first value. When a datum is written to a register of the register bank, the associated bit of the auxiliary register is set to a second value. The initialization of the microprocessor circuit takes places upon activation to ensure that all the registers and all the bits of the auxiliary register are in a defined, known state. When a datum is written, the respective bit is set automatically to the second value in order, thereby, to indicate that the auxiliary register has a value. The first value of the bit of the auxiliary register may be 0, for example, while the second value of the bits of the auxiliary register may be 1. It goes without saying that an opposite assignment is also possible.

In accordance with yet another mode of the invention, reading of a datum from one of the registers of the register bank is only possible if the associated bit of the auxiliary register has the second value. This means that only when the assigned bit of the register has the second value, e.g., 1, is the datum that is actually stored in the register read out. By contrast, if the associated bit in the auxiliary register had the first value, then a datum possibly held in the register would not be returned to the microprocessor, but, instead, a defined value, e.g., 0.

In accordance with yet a further mode of the invention, when a datum from one of the registers of the register bank whose associated bit of the auxiliary register has the logical "0" value is read, the datum "0" is returned.

This reveals that, to erase a register, the register, itself, need not be erased, rather it suffices to set the associated bit in the auxiliary register to the first value. This is enough to ensure that the actual datum in the auxiliary register can no longer be read out. A plurality of registers can, thus, be erased in a simple, fast, and current-saving manner.

In accordance with yet an added mode of the invention, in the event of a change from a first function to a second function, the data associated with the first function in registers of the register bank and the bit sequence of the auxiliary register are stored successively in the stack or the further stack. In other words, this means that not all the registers of the register bank are stored on the stack, but, rather, only those registers that have a bit with the second value in the auxiliary register. In addition to the data of the registers, the bit sequence of the auxiliary register is, likewise, stored on the stack to be able to restore the data in the correct registers in the event of a return.

In accordance with yet an additional mode of the invention, the circuit is provided with a second stack for storing at least some data in the register bank and making the second stack inaccessible by a programmer, and, if the circuit changes from a first function to a second function, the data associated with the first function in the registers of the register bank and the bit sequence of the auxiliary register is successively stored in one of the stack and the second stack.

In accordance with a concomitant mode of the invention, it is furthermore advantageous if, after the storage of the data and the bit sequence of the auxiliary register in the stack or in the further stack, the bits of the auxiliary register are set to the first value (logical "0"). This corresponds to the erasure of the register as explained above. Consequently, the registers themselves have not actually been erased, but, rather, only the bits of the associated auxiliary register.

Other features that are considered as characteristic for the invention are set forth in the appended claims.

Although the invention is illustrated and described herein as embodied in a microprocessor circuit for portable data carriers and a method for operating the circuit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
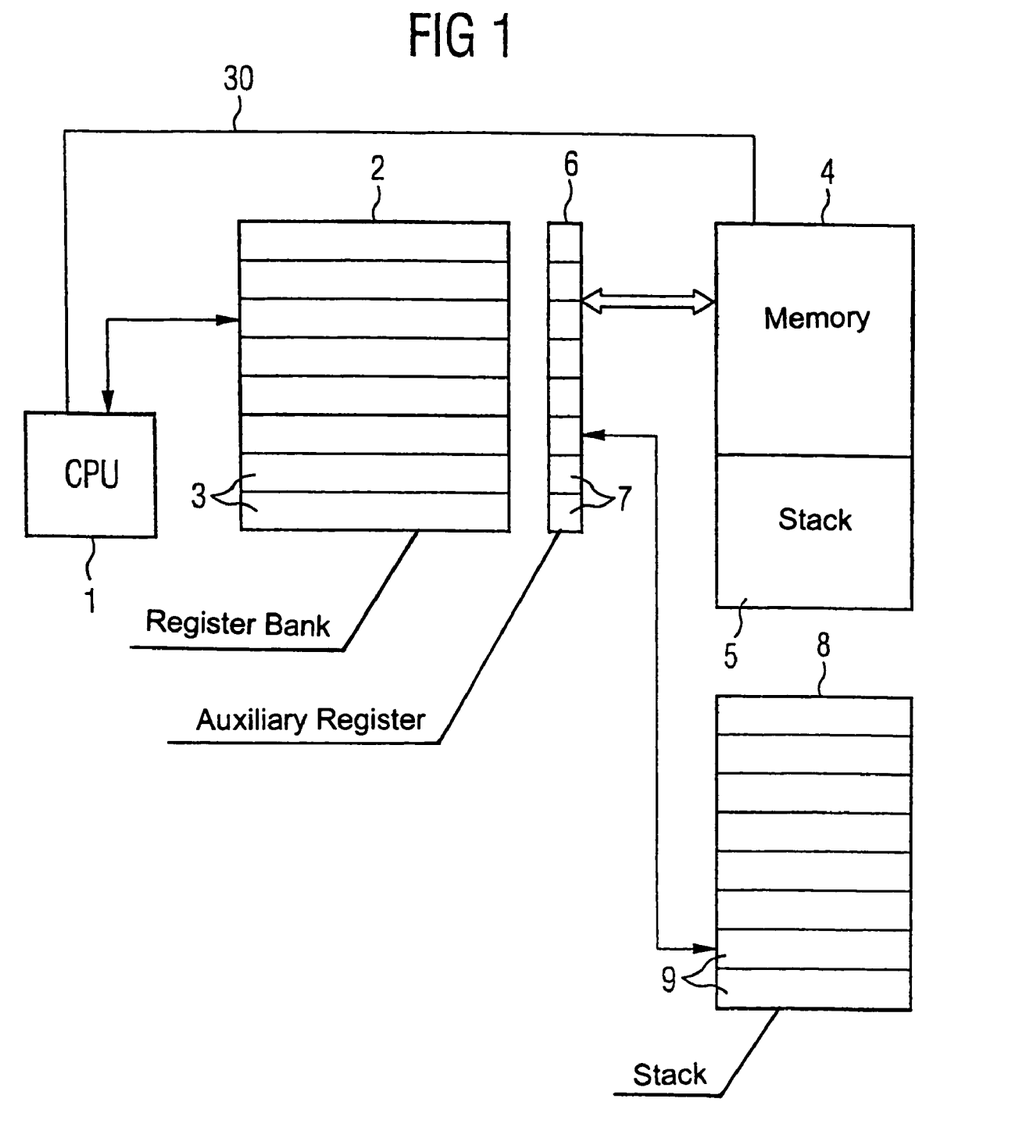
FIG. 1 is a block circuit diagram of a microprocessor circuit according to the invention.

Referring now to the figures of the drawings in detail and first, particularly to FIG. 1 thereof, there is shown a diagrammatic construction of the microprocessor circuit according to the invention. Because the construction of such microprocessor circuits is known, in principle, it will not be explained in detail here. The illustration is, therefore, also restricted to the components that are necessary for the invention.

The microprocessor circuit contains a control unit 1, which is connected to a memory 4 through a control line 30, a register bank 2, an auxiliary register 6, and a hardware-internal stack 8, which is designated below as a further stack. The memory 4 can be divided into different areas. By way of example, the memory may include a random access memory (RAM), a read-only memory (ROM), and EEPROM. Parts of these memory areas are associated with the operating system, which contains, in part, security-relevant data that must be kept secret. Furthermore, the memory 4 includes a stack 5, which represents a buffer store that can be accessed quickly. The latter can be utilized by all the programs held in the memory 4. This means that the stack 5 is publicly accessible to every function of the programs.

In the present example, the register bank 2 has eight registers 3, and exactly one datum can be stored in each register 3. Each register 3 is assigned a further register 7 of the auxiliary register 6. Exactly one bit is stored in each of the further registers 7, the bit containing an item of information regarding whether or not a datum is stored in the associated register 3.

The further stack 8, in which the data stored in the registers 3 are, preferably, stored in the event of a function change, is a so-called hardware-internal stack. This means that the latter is not accessible to programs stored in the memory 4. Consequently, a programmer cannot access this memory area. Rather, the management is the responsibility of the operating system. Although the further stack 8 is shown set apart from the memory 4 in FIG. 1, the further stack 8 may, of course, be part of the memory 4.

The illustration of the register 2 and of the auxiliary register 6 in FIG. 1 was chosen merely to be able to explain the assignment of the registers 3 and of the further registers 7. As will become apparent from the further description, the auxiliary register 6 need not necessarily be a register that is different from the register bank 2.

In this and the following embodiments, it is assumed by way of example that, in the case of a logic value "1" in the further register 7, a valid datum was written in the associated register 3 of the register bank 2.

Figure 2:
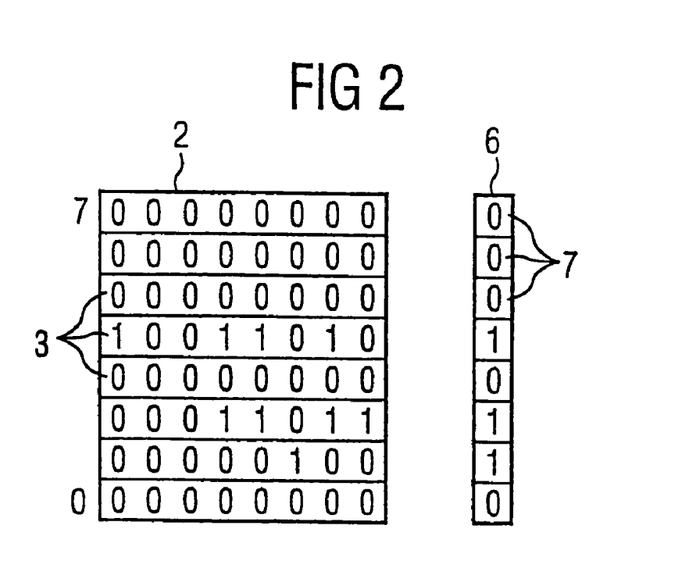
FIG. 2 is a diagrammatic illustration of a first exemplary embodiment of a register and an associated auxiliary register according to the invention.
Figure 3A:
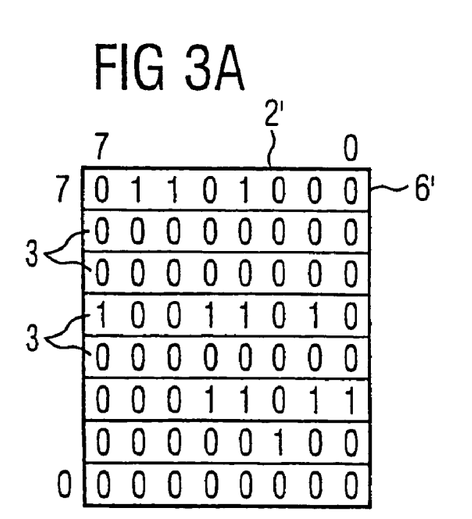
FIG. 3A is a diagrammatic illustration of a second exemplary embodiment of a register and an associated auxiliary register according to the invention in which the auxiliary register is part of the register.
Figure 3B:
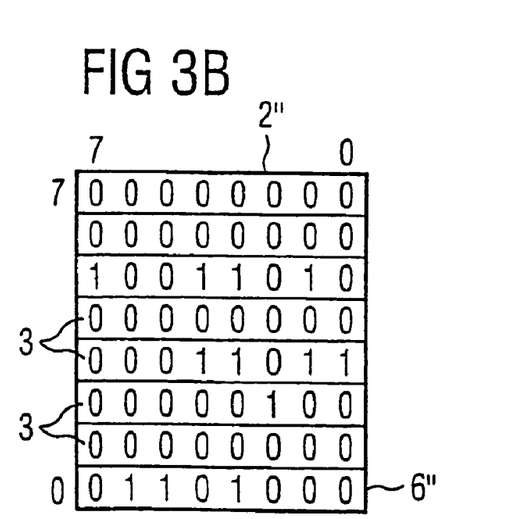
FIG. 3B is a diagrammatic illustration of the third exemplary embodiment of the register and the associated auxiliary register according to the invention in which the auxiliary register is part of the register.

FIGS. 2 and 3 show two possible embodiments of the association of the register bank 2 and of the auxiliary register 6.

In FIG. 2, the register bank 2 and the auxiliary register 6 are mutually separate register banks. The number of respective registers 3, 7 is identical. While an arbitrary number of bits can be stored in a register 3 of the register bank 2, depending on the embodiment, a further register 7 of the auxiliary register 6 is only able to store one bit in each case.

If the registers are consecutively numbered from 0 to 7 from bottom to top as in the present exemplary embodiments, then it can be seen from FIG. 2 that the registers 2, 3, and 4 have a valid datum. The respectively corresponding further registers 7, therefore, contain a logic "1". By contrast, a datum was not written to the remaining registers, so that the associated bit has a logic value "0".

In FIGS. 3A and 3B, a hardware change is not necessary because the auxiliary register according to the invention is stored in a register 3 of the register bank 2. The consequence of this is that, given a total of 8 registers, only 7 are available for writing for the function currently being executed. In FIG. 3A, the auxiliary register 6' is stored in the register 7. In FIG. 3B, the auxiliary register 6" is stored in the register 0. In such a case, the highest bit of the auxiliary register 6', 6" corresponds, for example, to the lowest register, in this case, register 0.

In the present exemplary embodiment, a datum with a word length of 8 bits can be stored in a register 3 of the register bank 2. In such a case, the lowest bit 0 of the auxiliary register 6', 6" is assigned to no register. As an alternative, the top-most bit 7 could also be assigned to none of the registers so that the bits 0 to 6 would be used for assignment to respective registers 3 of the register bank 21. Likewise, the top-most bit of the auxiliary register 6' could be assigned to the top-most register 3 of the register bank, while the bottom-most bit could be assigned to the register 0. FIG. 3B shows a register bank 2" in which the auxiliary register 6" is located in the register 0. The above-mentioned modifications could, likewise, be employed.

The method of operation when writing and reading a datum into a register of the register bank is as follows. As soon as a datum is written to a register 3 of the register bank 2, the corresponding bit of the auxiliary register 6, 6', 6" is set to the second value, logic "1" in all the exemplary embodiments shown. To read a datum from a register 3, first, the associated bit of the auxiliary register is checked. If the latter contains the first value (logic "1"), then the value 0 is returned regardless of whether or not a datum is present in the associated register 3. Only when the associated bit of the interrogated register 3 contains the second value (logic "1") is the datum present in the register read out. It is evident from this that, to initialize or erase a register, only the bits of the auxiliary register must be set to the first value (logic "0"). This is enough to ensure that no datum held in a register 3 can be read out.

As already described, upon the call of a second function from a first function, it is necessary to buffer-store the data held in the registers 3 on a stack. FIGS. 4 to 7 below show different embodiments of the way in which this can be realized.

Figure 4:
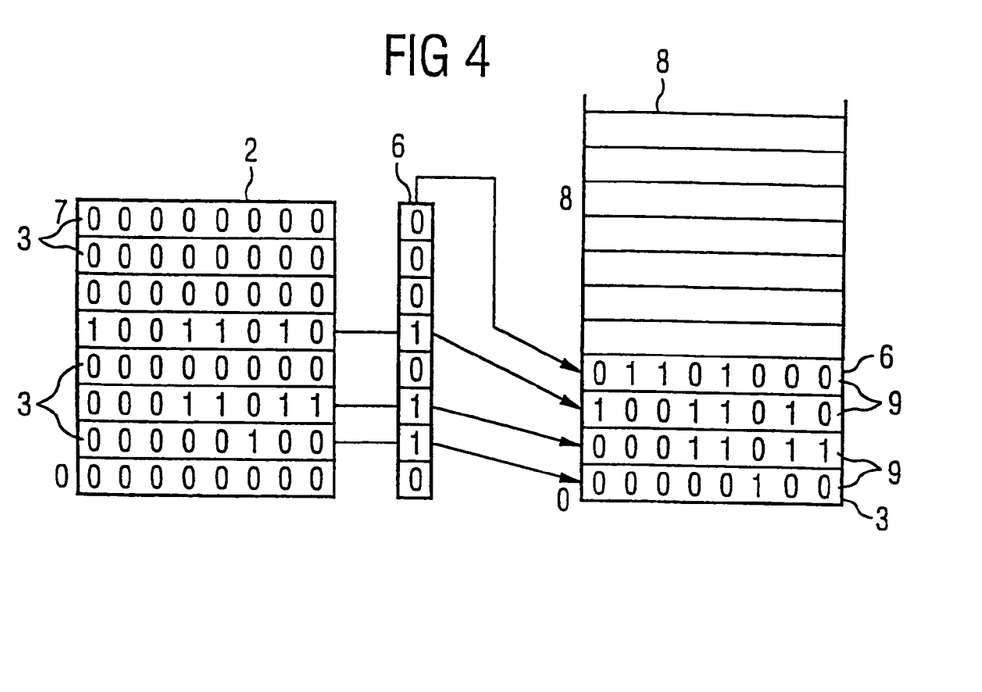
FIG. 4 is a diagrammatic illustration of a first exemplary embodiment showing the principle of the storage of the registers on the stack according to the invention.

FIG. 4 shows the configuration, disclosed in FIG. 2, of the register bank 2 and of the associated, separate auxiliary register 6. Upon the call of the second function, e.g., by the instruction CALL (function 2), those registers 3 of the register bank whose associated bits have the second value (logic "1") are, preferably, stored on the further stack 8. Provided that, as shown in FIG. 4, a register without data is situated between two registers 3 having data, such a register is skipped when writing to the stack 8. The consequence of this is that only those registers that include data are successively stored on the stack 8. In addition to the register contents, the bit sequence of the auxiliary register 6 is stored in a word row of the further stack 8. In such a case, the bit sequence of the auxiliary register 6 is, preferably, stored as the last value. By these measures, in the event of a return from the function 2 to the first function, the register contents can be written back from the stack 8 to the register bank 2, the respective contents being stored precisely in the register in which they were previously written.

Figure 5:
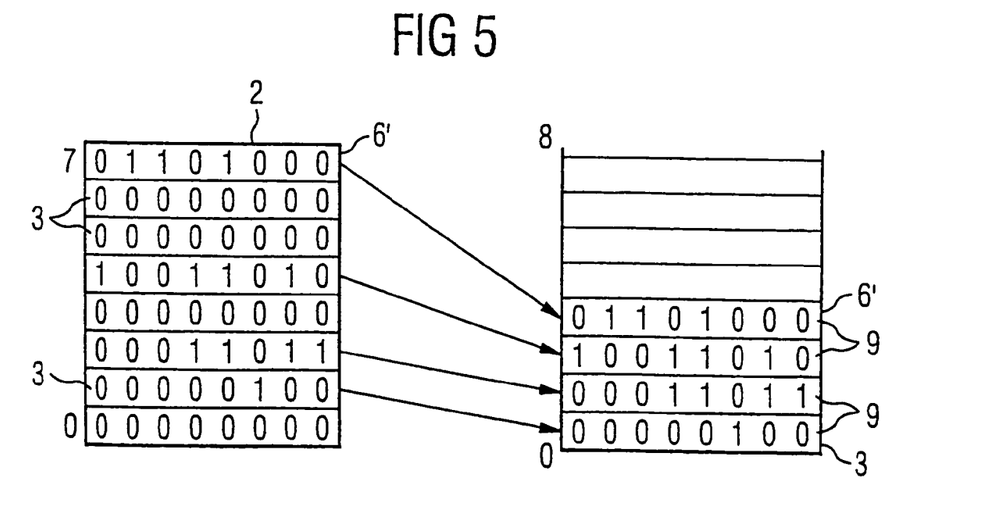
FIG. 5 is a diagrammatic illustration of a second exemplary embodiment showing the principle of the storage of the registers on the stack according to the invention.

FIG. 5 differs from FIG. 4 merely by the fact that the auxiliary register 6' is located in a register of the register bank 2. The register 7 is used in the present exemplary embodiment. The procedure otherwise corresponds to the procedure described with respect to FIG. 4.

It is often customary to divide a register bank 2 into a first area 10 and into a second area 20. In this case, those data that are required both by the calling function (first function) and by the called function (second function) are written in the second area 20. These are the transfer parameters. The first area 10 is used only by the called function, in order to buffer-store data there.

Figure 6A:
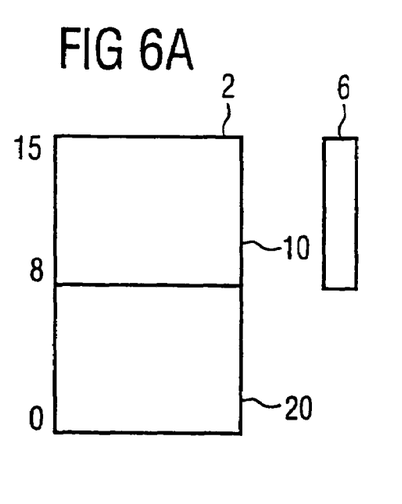
FIGS. 6A and 6B are diagrammatic illustrations of two embodiments of a register and associated auxiliary registers thereof according to the invention, the register being subdivided into a first area and into a second area.

It suffices to buffer-store only the registers of the first area 10 on the further stack 6. For this reason, as shown in FIG. 6A, only the first area 10 is associated with an auxiliary register 6.

Figure 6B:
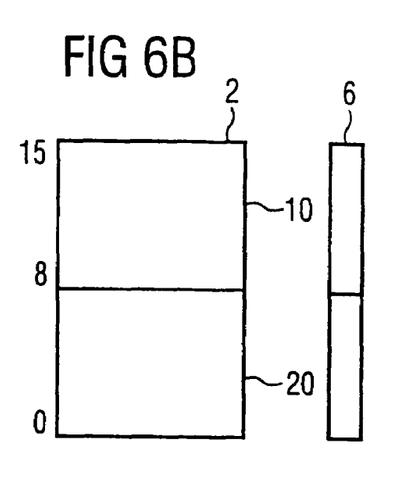

As an alternative, as shown by FIG. 6B, it is also possible for an auxiliary register 6 to be associated with both the first and to the second area 10, 20 of the register bank 2. In such a case, the transfer parameters are also buffer-stored on the stack upon the call of a function.

Figure 7:
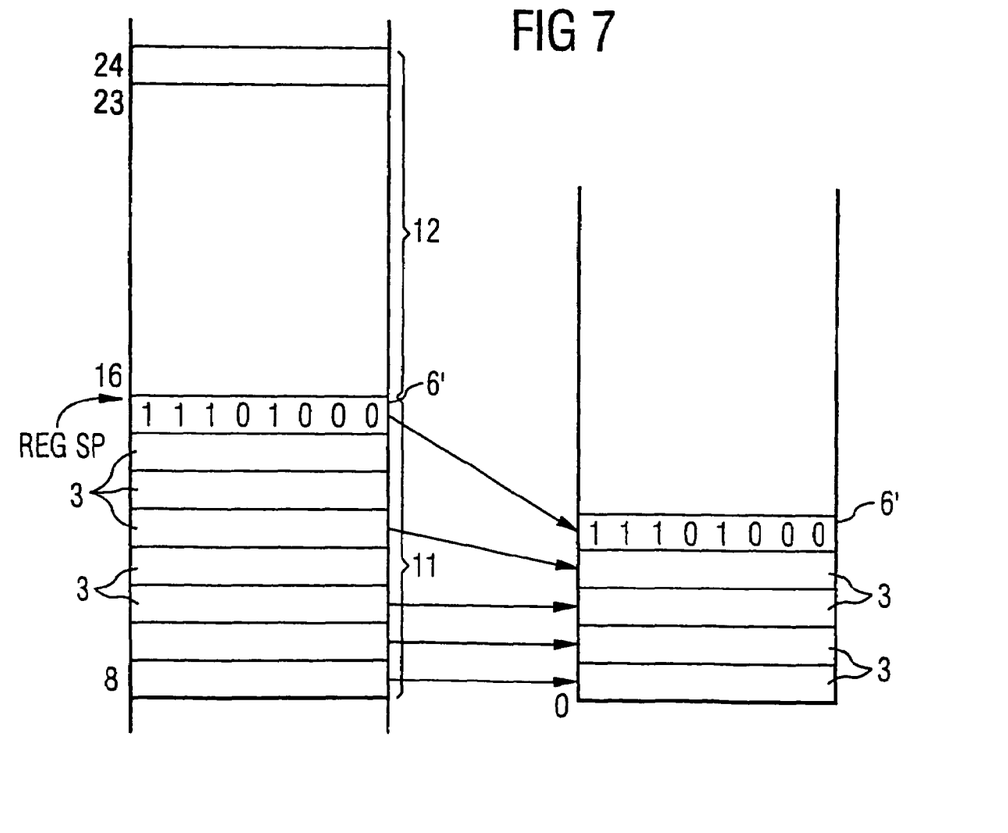
FIG. 7 is a fragmentary, diagrammatic illustration of a further exemplary embodiment of registers according to the invention in which the register is realized as a register window.

FIG. 7 shows the division of the register bank 2 into a plurality of register windows 11, 12. Although FIG. 7 only shows two register windows 11, 12, the register bank can have an arbitrary number of register windows. The register windows are all located in the first area 10, provided that the register bank is divided into a first and second area.

Exactly one register window is available for a function currently being executed. The register window is selected by a stack pointer REG SP. The registers allocated to a register window can, then, be written to by the function. The auxiliary register 6, 6' is stored in the respective top-most register of a register window.

The use of register windows is advantageous, in particular, when frequent function changes are performed. This procedure means that it is not necessary to store the written-to registers in a stack in the event of every function change.

In the present example, suppose that the register window 11 is already occupied or written to by a first function. The first function calls a second function, as a result, the stack pointer points to the next register window 12 (REG SP). As a result of the function call, in contrast to the previous exemplary embodiments, the register list is not stored on the stack, rather the stack pointer is merely shifted. The second function can, thus, utilize the register window 12 (registers 16 to 23), the auxiliary register being stored in the register 23. Upon the call of a third function, a third non-illustrated register window could be utilized. In the meantime, the register window written to first can, simultaneously, be written to a stack. This would be the register window 11 in the present exemplary embodiment. The individual registers are stored in the manner described in FIGS. 4 and 5, respectively.

Such a procedure enables extremely fast, energy-efficient, and reliable storage of the register contents stored in a register bank.

The exemplary embodiment shown in FIG. 7 in this case has register windows having an identical number of registers. This is not absolutely necessary. The size of the register window can be adapted to the registers required by the respective function. In such a case, however, one of the registers of a register window would, in principle, be used for storing the bit sequence of the auxiliary register.

We claim:

1. A microprocessor circuit, comprising:
   at least one control unit;
   at least one memory for free programming with at least one program having functions, said memory connected to said control unit;
   a register bank having registers, said register bank connected to said control unit;
   an auxiliary register comprising a number of further registers corresponding to a number of said registers of said register bank, each one of said further registers storing a single bit, each of the bits being associated with one of said registers of said register bank and indicating whether valid data was written in a respective one of said registers, said auxiliary register connected to at least one of said control unit or said register bank, and a stack for buffer-storing data of said auxiliary register and, as a function of the associated bit, of said registers of said register bank, said stack connected to at least one of said control unit, said register bank, or said auxiliary register.

2. The microprocessor circuit according to claim 1, including a second stack for storing at least some data in said register bank, said second stack connected to said control unit and inaccessible by the program.

3. The microprocessor circuit according to claim 1, wherein:
   said register bank has first and second areas with first and second registers;
   said first registers storing data of a called function; said second registers storing data of both a called function and data of a calling function; and at least said first registers are associated with a bit stored in a further register of said auxiliary register.

4. A microprocessor circuit, comprising:
   at least one control unit;
   at least one memory for free programming with at least one program having functions, said memory connected to said control unit;
   a register bank having registers, said register bank connected to said control unit;
   an auxiliary register comprising one further register for storing a bit sequence corresponding to a number of said registers of said register bank, each one of said further registers storing a single bit, each of the bits being associated with one of said registers of said register bank and indicating whether a valid data was written in respective one of said registers, said auxiliary register connected to at least one of said control unit or said register bank, and a stack for buffer-storing data of said auxiliary register and, as a function of the associated bit, of said registers of said register bank, said stack connected to at least one of said control unit, said register bank, or said auxiliary register.

5. The microprocessor circuit according to claim 4, wherein said auxiliary register is at least one of said registers of said register bank.

6. The microprocessor circuit according to claim 4, further comprising a second stack for storing at least some data in said register bank, said second stack being accessible only to an operating system of said control unit.

7. The microprocessor circuit according to claim 4, further comprising a second stack for storing at least some data in said register bank, said second stack inaccessible by a programmer.

8. The microprocessor circuit according to claim 4, further comprising a second stack for storing at least some data in said register bank, said second stack connected to said control unit and inaccessible by the program.

9. The microprocessor circuit according to claim 4, wherein:
   said register bank has first and second areas with first and second registers;
   said first registers storing data of a called function; said second registers storing data of both a called function and data of a calling function; and at least said first registers are associated with a bit of said bit sequence stored in said auxiliary register.

10. The microprocessor circuit according to claim 4, wherein:
    said register bank has first and second areas with first and second registers;
    said first registers storing data of a called function;
    said second registers storing data of both a called function and data of a calling function; and
    at least said first registers are associated with a bit of said bit sequence stored in said auxiliary register.

11. The microprocessor circuit according to claim 4, wherein said first area of said register bank is divided into a plurality of sub-areas respectively available to one of the functions of the program.

12. A method for operating a microprocessor circuit, which comprises the steps of:
    providing a circuit with:
      at least one control unit;
      at least one memory for tree programming with at least one program having functions;
      a stack for buffer-storing data;
      a register bank having registers; and
      an auxiliary register:
    setting all of the bits of the auxiliary register to a first value when the circuit is initialized;
    storing bits in the auxiliary register, each of the bits being associated with one of the registers and indicating whether a respective one of the registers contains a valid datum different from the first value;
    setting a bit of the auxiliary register associated with a respective one of the registers to a second value different from the first value when a datum is written to the associated register of the register bank;
    storing data being stored in the auxiliary-register and the registers of the register bank in the stack, selecting registers of the register bank being stored as a function of their associated bits, or storing data being stored in the stack in the auxiliary register and in the registers of the register bank, and selecting the registers of the register bank storing data as a function of the associated bits;
    the method further comprises, when a datum from one of the registers of the register bank whose associated bit of the auxiliary register has the first value is read, returning a predefined datum.

13. The method according to claim 12, wherein the first value corresponds to a logical "0".

14. The method according to claim 12, wherein the predefined datum corresponds to the datum "0".

15. The method according to claim 13, which further comprises, when a datum from one of the registers of the register bank whose associated bit of the auxiliary register has the first value read, returning the datum "0".

16. The method according to claim 12, which further comprises:

providing the circuit with a second stack for storing at least some data in the register bank and making the second stack inaccessible by a programmer; and if the circuit changes from a first function to a second function, successively storing the data associated with the first function in the registers of the register bank and the bits stored in the auxiliary register in one of the stack and the second stack.

17. The method according to claim 16, which further comprises setting the bits of the auxiliary register to the first value after storing the data and the bits stored in the auxiliary register in one of the stacks.

18. The method according to claim 12, wherein a register of the register bank is only stored on the stack if the associated bit of the auxiliary register has a value different from the first value.

19. The method according to claim 18, wherein the auxiliary register is stored as the last value on the stack.

* * * * *